J. WALDRON.
IMPLEMENTS FOR SIFTING COAL-ASHES.
No. 170,317. Patented Nov. 23, 1875.
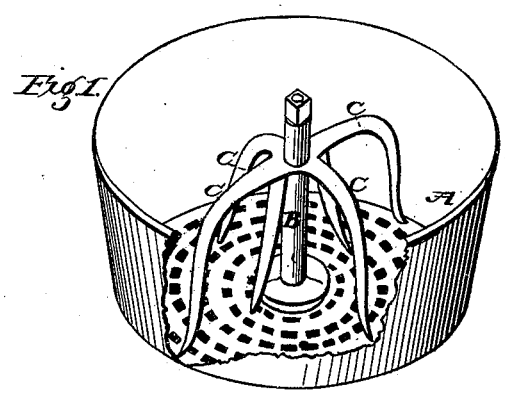
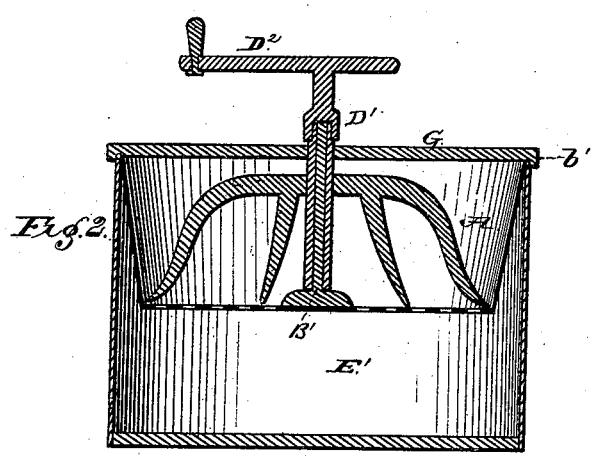
Witnesses:
Frank B. Barrows
Southward Potter 2d
Inventor:
John Waldron

UNITED STATES PATENT OFFICE.

JOHN WALDRON, OF NEW BEDFORD, MASSACHUSETTS.

IMPROVEMENT IN IMPLEMENTS FOR SIFTING COAL-ASHES.

Specification forming part of Letters Patent No. 170,317, dated November 23, 1875; application filed June 4, 1875.

*To all whom it may concern:*

Be it known that I, JOHN WALDRON, of New Bedford, in the county of Bristol and State of Massachusetts, have invented a new and useful Improvement in Implements for Sifting Coal-Ashes, and other kindred purposes, which improvement is fully set forth in the following specification, reference being had to the accompanying drawings.

In Figure 1, A represents the sifter, which is made of tin, cast-iron, or other metal, the bottom of which is perforated with elongated holes from the center to the circumference, at equal distances from each other, on a true circle. In the center of the pan A is a perpendicular spindle rising above the pan. B is a hollow shaft, which revolves on the spindle B'. C C C C C are teeth, of some metallic substance, attached to the shaft B, which are so placed that they move between the perforated holes on the circle in the bottom of pan A.

In Fig. 2, A is a view of the pan, resting, by a flange, $b'$, on the tub E', with the cover G attached. $D^1$ is a key, attached to handle $D^2$ and fitting the top of the shaft B', which it turns in the pan A either forward or backward.

I claim as my invention—

The inclosed and fixed sieve A, provided with spindle B', in combination with the sleeve B, provided with the stirrers C C C C, and the removable handle $D^1$ $D^2$, constructed and arranged substantially as shown.

JOHN WALDRON.

Witnesses:
    DAVID B. FOLGER,
    SOUTHWARD POTTER, 2d.